Sept. 3, 1940.   J. E. SMITH   2,213,723
ELECTRICAL HEATING UNIT
Filed Dec. 31, 1937
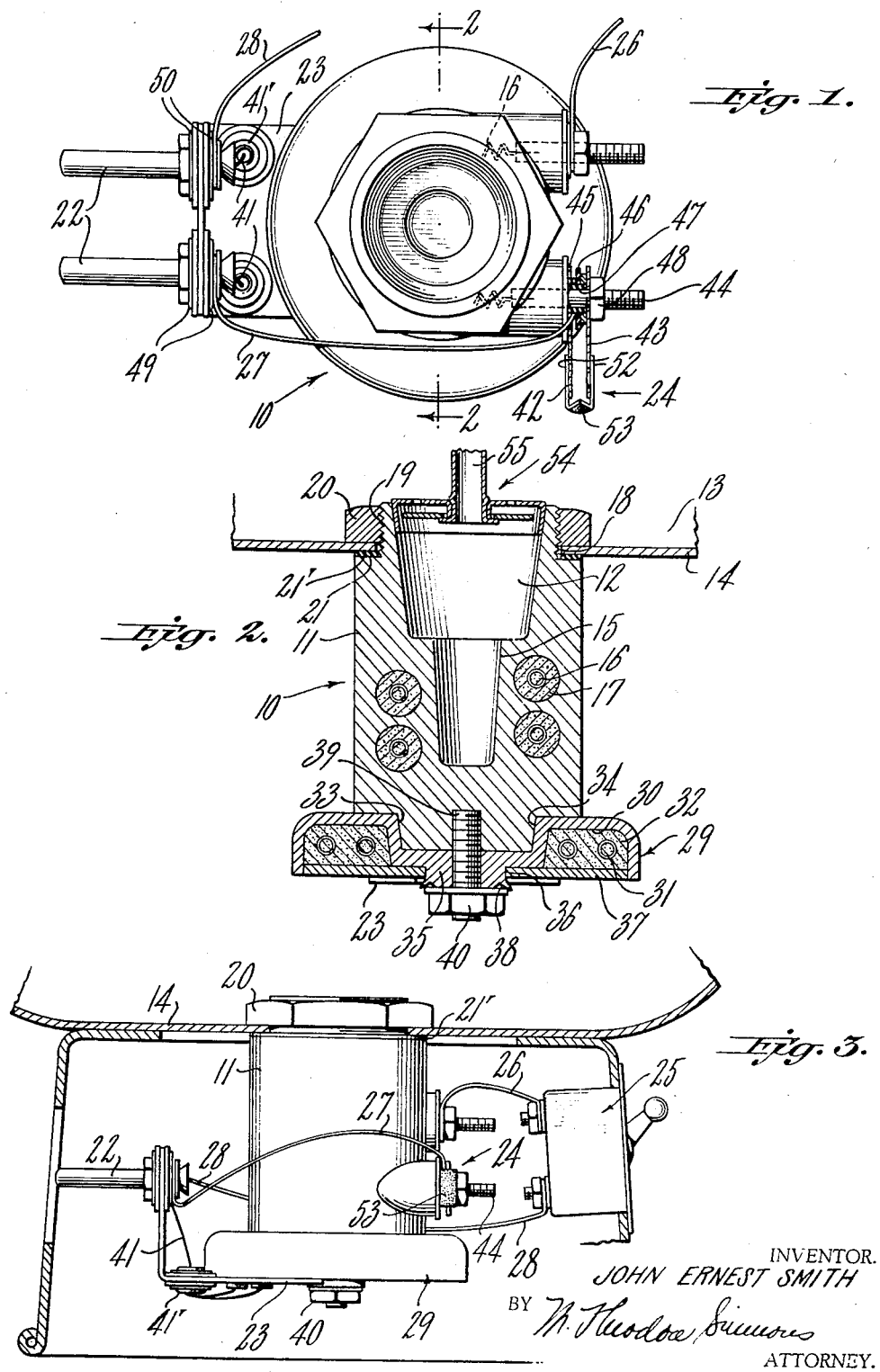
INVENTOR.
JOHN ERNEST SMITH
BY
ATTORNEY.

Patented Sept. 3, 1940

2,213,723

UNITED STATES PATENT OFFICE 2,213,723

ELECTRICAL HEATING UNIT

John E. Smith, Plainfield, N. J.

Application December 31, 1937, Serial No. 182,713

14 Claims. (Cl. 219—44)

This invention relates to electrical heating devices, and more particularly to a heating unit adapted for installation in a heating vessel such as a coffee percolator.

According to one of the features of this invention the unit is provided with two heating elements, one of which is used in developing the necessary high heat for percolating water through the coffee, whereas the other element is employed for furnishing the required low heat to keep the prepared coffee at the desired temperature.

Another feature of improvement resides in the provision of a water well adjacent the heating elements and in communication with the fluid in the heating vessel, the arrangement of the parts being such that the heat generated in the high temperature heating element is rapidly transferred to the fluid in the water well. For this purpose the high temperature element is cast within a housing comprising a body of metal of high thermal conductivity such as aluminum. The heating element is embedded in ceramic insulation and positioned close to the well so that the intervening thickness of metal therebetween is relatively small. On shrinking, the metal of the casting creates tremendous pressure against the ceramic coverings of the heating element, thereby setting up compressive and compacting forces thereagainst bringing the parts of the heating element into intimate contact with the metallic housing for the most efficient transfer of heat.

As a result of rapid transfer of heat from the filament, through the body of the metal housing and into the water well, it is possible to work the filament at a very high wattage and to therefore bring the water in the heating vessel to percolating temperature in a relatively short space of time.

Preferably the electrical connections are such that the low heat element remains on continuously, whereas the high heat or percolating element is connected through a suitable switch for turning on or off as needed.

Another feature of this invention is the provision of a novel fuse arrangement in the circuit of the high heat element to protect the same against destructive high temperatures.

Various other features of advantage will appear as the description proceeds, reference being made to the accompanying drawing in which:

Figure 1 is a top plan view of heating unit embodying my invention, with the fuse portion broken away in section, Fig. 2 is a vertical section on the line 2—2 of Fig. 1, and Fig. 3 is a side elevation of the heating unit installed in the bottom of a coffee percolator, the walls of which are shown broken away in section.

In the drawing, the reference numeral 10 indicates a heating unit comprising a housing 11 having a water well 12 opening into the interior 13 of a coffee percolator or other heating vessel 14. The well extends downward within the housing 11 and may be reduced in diameter as shown at 15 to extend within the convolutions of a spiral heating element 16 having a ceramic insulating covering 17. Preferably, the housing 11 is formed of metal having high thermal conductivity such as aluminum, and is cast around the spiral heating element 16 so as to completely enclose the same in the metal surrounding the water well. By reason of the shrinkage of the metal of the housing in cooling after casting, there is a tremendous pressure exerted by the metal against the surface of the ceramic material 17 embedding the heating element 16. The parts are thereby brought in very close contact under pressure and any resistance to heat transfer from the heating element 16 to the metal of the housing 11 is reduced to a minimum. Therefore, the transmission of heat from the heating element 16 to the well is carried out rapidly and with high efficiency. As a further advantage of this construction the heating element 16 can be worked at very high wattage owing to the rapidity of heat transfer therefrom and to the adjacent portions of the highly conductive metal of the housing.

For convenience in attaching the housing to the heating vessel 14, the latter is provided with an opening 18, and the housing is reduced and threaded at the upper portion surrounding the well 12 as indicated at 19 for receiving a nut 20 adapted to clamp the wall of the vessel 14 between a shoulder 21 of the housing, an interposed washer 21', and the lower face of the nut 20.

As thus installed, the heating element 16 and the well 12 are in position to quickly and efficiently set up the high temperatures required in the heating vessel. Current may be supplied to the heating element 16 through the medium of terminal pins 22 carried by a bracket 23 and adapted for connection to a service plug (not shown), electrical connections being completed through a fuse 24, a toggle switch 25, and the wiring connections 26, 27 and 28.

There is also provided a warming element at the base of the housing beneath the water well.

Preferably, this is in the form of a member or housing 29 having a circumferential channel 30 containing a heating element 31 embedded in ceramic material 32.

A tapered extension 33 at the base of the housing 11 fits a similarly tapered depression 34 in the member 29. A lug 35 at the bottom of the extension 33 passes through an opening 36 of a plate 37 which covers the ceramic material 32 of the heating element 31, the lug 35 being swaged or riveted over at 38. These parts are fastened as a unit to the housing 11 by means of a threaded stud 39 and a nut 40. The bracket 23 may be secured to the plate 37 by spot welding or in any other approved way.

Current is fed to the heating element 31 from the terminal pins 22 to which the ends 41 of said element are permanently connected.

If desired, the housing 29 may be made larger in diameter or have an offset portion to permit the wire to be brought up through the top of the housing and directly to the terminal posts 22, thereby eliminating the insulation 41' in the bracket 23.

The fuse arrangement 24 may comprise a pair of spring blades 42 and 43 mounted on a screw threaded stud 44, the blade 42 being connected to the conductor 27 and insulated from the stud 44 by insulating washers 45 and 46 and a collar of insulation 47. The other spring blade 43 is mounted in side-by-side relation to the blade 42 on the stud 44, and the assemblage of parts is held firmly together by a nut 48 tightened against the outer face of the blade 43. The conductor 27 engages the spring blade 42 behind the washer 46 and is also insulated from the bracket 23 at the terminal pins 22 by insulating washers 49. Conductor 28 is similarly insulated from the opposite terminal pin by washers 50. The fuse element comprises a pair of metal pieces 52 bent toward each at one end and held together by fuse metal 53. The legs of the fuse element engage over the free ends of the spring blades 42 and 43, holding them toward each other under tension.

If desired, this heating unit may be fitted with a pump as indicated at 54 having a rising tube portion 55 adapted to hold a percolator screen (not shown).

In operating the heating unit, a service plug is connected to the terminal pins 22, and the toggle switch turned on to permit current to enter the heating element 16. The heat generated by the heating element is rapidly transferred through the highly conductive metal of the housing 11 and into the well openings 15 and 12, from which it rises into the zone of the pump and thence into the percolator screen by circulation through the pump tube.

Temperature variations in the heating element and the adjacent portions of the low fusing housing are quickly followed by the fuse element, so that it is at all time an efficient gage of thermal conditions in the heating unit, and will act in time to break the circuit before destructive temperatures have been reached in the parts designed to be protected.

The fuse 24 and its holding means, as illustrated in the present example of the invention, have been positioned so as to place the fuse where it will be quickly responsive to temperature changes in the heating unit, but it is to be understood that the construction and location of the fuse element may be changed if found advantageous.

After the contents of the vessel 14 have been heated to the proper degree and the percolating operation completed, the heating element 31 being energized at all times through the service plug terminals is capable of keeping the liquid coffee at the proper temperature for serving.

It is to be understood in conclusion that the invention as above exemplified may be embodied in various other forms of construction and modifications, and is therefore not restricted in its applications except as defined in the appended claims.

I claim:

1. An electrical heating unit adapted for installation in a heating vessel, comprising a housing having a water well communicating with the interior of the vessel, said well being reduced in size adjacent the bottom thereof, a spiral heating coil surrounding the reduced portion of the well, a second heating element beneath said coil at the base of said housing, and a circulating pump mounted at the upper end of the well and communicating with the interior of the vessel.

2. An electrical heating unit adapted for installation in a heating vessel, comprising a housing having a water well communicating with the interior of the vessel, a heating element embedded in insulating material in said housing adjacent the well, a second housing beneath said well, said second housing having a circumferential channel, a heating element embedded in insulating material in said channel, a plate covering the insulating material, and means for holding the two housings together, the second heating element being adapted to supply additional heat to the well directly through the body of the housing.

3. An electrical heating unit adapted for installation in a heating vessel, comprising a housing having a water well communicating with the interior of the vessel, a heating element in said housing associated with the well, a second housing having a circumferential channel beneath said well, a heating element in said channel, a plate covering the channel, said second named housing having a lug portion extending through an opening in said plate, the lug being swaged over on the outside of the plate, and fastening means including a threaded part passed through said lug and into the base of the first named housing.

4. An electrical heating unit, comprising a housing having a water well, said housing being of metal and of high thermal conductivity cast around a heating element associated with the well, and a second housing carrying a heating element and detachably connected to the first named housing.

5. An electrical heating unit, comprising a housing having a water well, said housing being of metal of high thermal conductivity cast around a heating element associated with the well, and a second housing having a channel containing a heating element, said second housing being secured to the first named housing beneath the well.

6. An electrical heating unit, comprising a housing having a water well, said housing being of metal of high thermal conductivity cast around a spiral heating element, said well extending downward into the spiral heating element, and a second heating element associated with said housing beneath the well.

7. An electrical heating unit, comprising a housing having a water well, said housing being of metal of high thermal conductivity cast around a heating element associated with the well, and a second housing carrying a heating element and detachably connected to the first named housing, the latter being reduced adjacent the mouth of the well to form a shoulder, the reduced portion extending through an opening in the bottom of a heating vessel, and means for holding said shoulder against the outer portion of the vessel surrounding said opening.

8. An electrical heating unit adapted for installation in a heating vessel, comprising a housing having a water well communicating with the interior of the vessel, a heating element in said housing associated with the well, a second housing having a circumferential channel beneath said well, a heating element in said channel, a plate covering the channel, and means for securing said plate in place.

9. An electrical heating unit adapted for installation in a heating vessel, comprising a housing having a water well communicating with the interior of the vessel, a heating element in said housing associated with the well, a second housing having a circumferential channel beneath said well, a heating element in said channel, a plate covering the channel, a mount for a pair of terminals arranged to receive a detachable service plug, and means for securing said plate and said terminal mount to said housing.

10. An electrical heating unit comprising a housing having a water well, said housing being of metal of high thermal conductivity cast around a heating element adjacent the well, a second heating element of smaller capacity than the first mentioned heating element and associated with said well, a pair of terminals to which said heating elements are connected, and a fuse connected in circuit between the terminals and the heating element of higher capacity.

11. An electrical heating unit comprising a housing having a water well, said housing being of metal of high thermal conductivity cast around a heating element adjacent the well, and a second heating element of smaller capacity than the first mentioned heating element and operatively associated with said well, a pair of terminals to which the heating elements are connected, and a switch arranged to interrupt the circuit to one of said heating elements.

12. Means for heating the contents of a vessel comprising an electrical heating unit mounted therein and having a housing with a water well communicating with the interior of the vessel, the well having an area of reduced capacity at its lower end, and a heating coil adjacent the lower end of said well, and a circulating pump mounted at the upper end of the well having a valve for controlling the flow of water to said well.

13. An electrical heating unit adapted for installation in a heating vessel, comprising a housing having a water well communicating with the interior of the vessel, a spiral heating coil surrounding the base of said well, a second heating element surrounding the bottom of the housing beneath the spiral coil, the base of said well comprising a cavity of reduced capacity, and a circulating pump mounted at the upper end of the well and communicating with the interior of the vessel.

14. An electrical heating unit adapted for installation in a heating vessel, comprising a housing having a water well communicating with the interior of the vessel, a heating element in said housing surrounding the well, terminal means associated with said housing adapted for connection to a power line, a fuse between said heating element and said terminal means, and a second heating element beneath the well at the base of the housing, said second element being connected directly to said terminal means, and being of smaller capacity than the first mentioned heating element.

JOHN E. SMITH.